United States Patent
Schmidt-Schäffer

(10) Patent No.: US 12,065,248 B2
(45) Date of Patent: Aug. 20, 2024

(54) SEAT ASSEMBLY FOR A CABIN OF A MEANS OF TRANSPORTATION

(71) Applicant: Airbus Operations GmbH, Hamburg (DE)

(72) Inventor: Tobias Schmidt-Schäffer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 132 days.

(21) Appl. No.: 17/610,061

(22) PCT Filed: Aug. 27, 2020

(86) PCT No.: PCT/EP2020/074000
§ 371 (c)(1),
(2) Date: Nov. 9, 2021

(87) PCT Pub. No.: WO2021/037995
PCT Pub. Date: Mar. 4, 2021

(65) Prior Publication Data
US 2022/0306298 A1    Sep. 29, 2022

(30) Foreign Application Priority Data
Aug. 30, 2019  (DE) ..................... 10 2019 123 321.6

(51) Int. Cl.
*B64D 11/06* (2006.01)
(52) U.S. Cl.
CPC ...... *B64D 11/0601* (2014.12); *B64D 11/0605* (2014.12); *B64D 11/0643* (2014.12); *B64D 11/0646* (2014.12)
(58) Field of Classification Search
CPC ............ B64D 11/0601; B64D 11/0605; B64D 11/0643; B64D 11/0646
See application file for complete search history.

(56) References Cited

U.S. PATENT DOCUMENTS

| | | |
|---|---|---|
| 2007/0040434 A1 | 2/2007 | Plant |
| 2010/0065684 A1 | 3/2010 | Ruiter et al. |

(Continued)

FOREIGN PATENT DOCUMENTS

| | | |
|---|---|---|
| DE | 102015105540 A1 | 10/2016 |
| EP | 3309071 A1 | 4/2018 |

(Continued)

OTHER PUBLICATIONS

14 CFR § 25.815, Jan. 1, 2009 (Year: 2009).*

(Continued)

*Primary Examiner* — Timothy D Collins
*Assistant Examiner* — Justin Michael Heston
(74) *Attorney, Agent, or Firm* — Lerner David LLP

(57) ABSTRACT

The invention relates to a seat assembly for a cabin of a means of transportation, having an aisle which is arranged in the longitudinal direction of the cabin, two mutually spaced cabin walls which are oriented parallel to the aisle at least in some regions and laterally delimit the cabin, two outer passenger seat regions which are separated from one another by the aisle and each of which adjoins one of the two cabin walls, wherein the outer passenger seat regions have at least one row of seats with a respective inner first seat module which faces the aisle, a central second seat module adjoining the first module, and an outer third seat module adjoining the respective cabin wall. Each of the seat modules has a seat and an ottoman paired with the seat or a foot rest at a distance from the respective seat, and the third seat module is offset to the second seat module in the longitudinal direction such that the seat of the third seat module adjoins the ottoman of the foot rest of the second seat module in the transverse direction.

16 Claims, 3 Drawing Sheets

(56) References Cited

U.S. PATENT DOCUMENTS

| | | | |
|---|---|---|---|
| 2015/0329208 A1* | 11/2015 | Eakins | G06F 30/15 703/1 |
| 2017/0240283 A1* | 8/2017 | Dowty | B64D 11/0604 |
| 2017/0259921 A1 | 9/2017 | Valdes De La Garza et al. | |
| 2018/0022458 A1 | 1/2018 | Weifenbach | |
| 2018/0281959 A1 | 10/2018 | Braca et al. | |

FOREIGN PATENT DOCUMENTS

| | | | |
|---|---|---|---|
| EP | 3378770 A1 * | 9/2018 | B60N 2/01 |
| EP | 3378770 A1 | 9/2018 | |
| WO | 2005014395 A1 | 2/2005 | |
| WO | 2018187071 A1 | 10/2018 | |

OTHER PUBLICATIONS

German Search Report for Application No. 102019123321.6 dated Feb. 14, 2022, 2 pages (p. 2 cateogrizing cited references).
International Search Report for Application No. PCT/EP2020/074000 mailed Nov. 23, 2020, 2 Pages.

* cited by examiner

SEAT ASSEMBLY FOR A CABIN OF A MEANS OF TRANSPORTATION

CROSS-REFERENCE TO RELATED APPLICATIONS

The present application is a national phase entry under 35 U.S.C. § 371 of International Application No. PCT/EP2020/074000 filed Aug. 27, 2020, published in German, which claims priority from German Application No. 102019123321.6 filed Aug. 30, 2019, the disclosures of which are incorporated herein by reference.

TECHNICAL FIELD

The invention relates to a seat assembly for a cabin of a means of transportation, a cabin of a means of transportation and a means of transportation having a fuselage and at least one cabin configured therein.

BACKGROUND TO THE INVENTION

Means of transportation, such as for example aircraft, rail vehicles, watercraft or coaches, may have passenger seat regions which generally have assemblies comprising seats. In particular, in the case of means of transportation for longer journeys, seat assemblies which provide a particularly high level of seating and travel comfort are also known. The seat assemblies may also have, for example in addition to the actual seats, foot rests or ottomans with foot rests integrated therein. If the seat is additionally displaceable relative thereto, the seat together with a foot rest could provide a reclining position.

Known seat assemblies with increased comfort are primarily to be found in commercial aircraft for long-haul flights, which have a larger fuselage diameter and thus have a relatively large installation space in the cabin.

This permits, for example, the implementation of two aisles and two outer and one inner passenger seat region. Seat assemblies for aircraft which have smaller diameters and a cabin with a central aisle are known, however, with only two seat modules.

SUMMARY OF THE INVENTION

It is thus an object of the invention to provide a seat assembly with which means of transportation having a small cabin width and, in particular, a single aisle are also able to be equipped and by which a large number of passengers are able to be accommodated with a high level of comfort.

The object is achieved by a seat assembly having the features of the independent claim 1. Advantageous embodiments and developments may be derived from the independent claims and the following description.

A seat assembly for a cabin of a means of transportation is proposed, having an aisle which is arranged in a longitudinal direction of the cabin, two mutually spaced cabin walls which are oriented parallel to the aisle at least in some regions and laterally delimit the cabin, two outer passenger seat regions which are separated from one another by the aisle and each of which adjoins one of the two cabin walls, wherein the outer passenger seat regions have at least one row of seats with a respective inner first seat module which faces the aisle, a central second seat module adjoining the first module, and an outer third seat module adjoining the respective cabin wall, wherein each of the seat modules has a seat and an ottoman paired with the seat or a foot rest at a distance from the respective seat, and wherein the third seat module is offset to the second seat module in the longitudinal direction such that the seat of the third seat module adjoins the ottoman or the foot rest of the second seat module in the transverse direction.

The seat assembly according to the invention is thus limited to two outer passenger seat regions which are separated from one another by a single aisle. The particularity of the seat assembly according to the invention is that the two passenger seat regions in each case have three seat modules arranged next to one another. Due to the offset, in particular, of the outer third seat module in the longitudinal direction, it is easier for the user to reach this outer seat module. Passing through the first or second seat module is not necessary.

In this context, an ottoman is to be understood as a built-in component which particularly preferably has a comfortable option for placing the feet. An ottoman in this case is arranged in the seat direction in front of the relevant seat and has an overall height or height of a foot rest adapted to the height of a seat surface. The ottoman may be arranged fixedly on the cabin floor or it may be movable to a certain extent at least in the longitudinal direction of the cabin. In addition to the possibility of the integration of a foot rest, a storage surface for storing personal objects could also be provided. Moreover, it is also conceivable to accommodate electronic fixtures, for example a screen or components coupled to the screen.

The seat of the third seat module is located next to the ottoman or the foot rest of the second seat module. The seat does not necessarily have to be arranged entirely and exclusively next to the foot rest or the ottoman but the two components could, for example, also merely partially overlap in the longitudinal direction. The seat could accordingly be displaced slightly further in the longitudinal direction.

The intermediate space between the ottoman and the seat of the third seat module is open on a side facing the aisle. If a user enters a gap located between the two successive first seat modules in the longitudinal direction, the user may pass directly to the second seat module and into the third seat module. The first seat module may also be reachable, for example, directly from the aisle and does not require any special measures therefor.

The second seat module could be reached from a gap between two first seat modules located in front of one another. The user could pass along the ottoman or the foot rest of the second seat module in the longitudinal direction. To this end, it could be advantageous if the ottoman or the foot rest is able to provide a corresponding space through which the user is able to pass to the seat of the second seat module. It might also be conceivable to move the ottoman or the foot rest into a use position and a through-passage position so that the seat of the second seat module may be reached.

As a result, a very compact design of the cabin with very comfortable seat modules may be achieved by the seat assembly according to the invention. For this reason, the use of space is also particularly effective since the second and the third seat module may share the same access between two successive first seat modules. Means of transportation which have only a single aisle may be provided with two assemblies of three respective seat modules located next to one another. A significant saving of installation space may result therefrom, said installation space being filled up, for example, with additional seats or seat modules.

In a particularly advantageous embodiment, the ottomans and/or the foot rest of the second and third seat modules have a smaller width than the associated seat. As a result, a nesting of the seat modules in the lateral direction may be improved. Due to the large offset of the seats of the second and the third seat module in the longitudinal direction, the width taken up jointly by the second seat module and the third seat module is significantly less than the widths of the two seats together.

It is preferred that a laterally external boundary of the seat of the second seat module is located closer to the cabin wall belonging to the respective passenger seat region than a laterally internal boundary of the seat of the adjoining third seat module. The external boundary of the seat of the second seat module may be closer to the cabin wall, in a range of approximately 3 inches (ca. 7.6 cm) to approximately 8 inches (ca. 20.3 cm), than the internal boundary of the seat of the third seat module. Thus, as a result, the greatest possible density in the lateral direction is achieved, wherein the combination of a second and a third seat module in each case has straight outer edges which run parallel to the aisle.

In a further particularly preferred embodiment, the second seat module has a foldable foot rest which is configured to clear a floor located below the foot rest for reaching the seat of the second seat module if required. The foldable foot rest simplifies the access to the second seat module or the seat located therein. Due to the foldability of the foot rest, the comfort of the relevant user is not restricted. The folding function could be achieved, for example, by a hinge on a wall of the second seat module or the adjoining third seat module. Both the hinge itself and a mechanical stop arranged opposite the hinge could be used for blocking or holding the foot rest.

Preferably the first seat module and the second seat module are offset to one another in the longitudinal direction such that the armrests of the seats of these two seat modules substantially do not overlap in the longitudinal direction. As a result, two users sitting adjacent to one another may comfortably use their armrests without their arms inadvertently coming into contact with one another. The offset of the first seat module and the second seat module in the longitudinal direction could be limited to an armrest length or could be just above this.

It is advantageous if the seat of the first seat module is located in front of the seat of the second seat module in the longitudinal direction. As a result, an approximately rectilinear aisle is produced, i.e. not kinked, and which is to be passed through intuitively to reach the second and the third seat module.

It is conceivable that the at least one row of seats has a plurality of rows of seats, wherein a distance of at least 22 cm is present between the first seat modules and second seat modules of successive rows of seats, such that the second and third seat module may be reached by a common through-passage. Such a through-passage width permits a relatively dense staggered arrangement in the longitudinal direction and yet permits the gap or the intermediate space between successive seat modules to be passed through. Since the through-passage is limited on one side by an ottoman or foot rest, which in each case has a very low height, a user is not restricted in terms of the perceived comfort thereof.

The seat modules could preferably have a partition which runs around the respective seat at least in some regions. The privacy of each user is significantly improved by the partition and in spite of the number of seat modules the perceived comfort is not restricted.

At least the partition between the aisle-side and central seat could be configured to be advantageously shaped with an S-shape in order to improve the access to the seats. A further advantageous embodiment permits an increase in the space available if an S-shaped design of the partition is provided in and immediately in front of the shoulder region in the two seats adjoining one respective partition, wherein a uniform aisle width is ensured between the two partitions.

In a further preferred embodiment, the seats of the seat modules have in each case a seat direction running parallel to the longitudinal axis. As a result, the seat assembly according to the invention differs significantly from other assemblies in which the seat directions run partially obliquely to the adjoining aisle. As a result, it is not necessary to take different measures in order to permit a user to pass through the aisle.

As already indicated, the first seat module may have an access facing into the aisle. The first seat module may thus be reached easily and independently of the other laterally adjoining seat modules.

In an advantageous embodiment, at least one of the ottomans or the foot rest has a stowage compartment or a storage surface. Personal objects of a user may thus be stored in the immediate vicinity, directly in the seat module. A storage surface, however, could also be used for cabin crew to store objects, which for example have to be briefly stored when serving meals and beverages.

It may also be advantageous to provide an extendable table or a segmented table instead of, or in combination with, the storage surface. An extendable table may possibly also be provided for fastening an IFE unit or a fold-out screen.

The invention further relates to a cabin for a means of transportation having at least one above-described seat assembly. The cabin may be arranged in a fuselage of the means of transportation.

The cabin could have a width which is in a range of 3.7-4.5 m. Such a cabin could also be implemented in smaller commercial aircraft which have dimensions which are significantly below conventional long-haul aircraft.

The invention finally relates to a means of transportation having a fuselage and at least one cabin configured as shown above.

Particular advantages are achieved when the means of transportation is a commercial aircraft. In the limited installation space provided therein, a significant increase in the perceived personal comfort for travelers is thus achieved.

BRIEF DESCRIPTION OF THE FIGURES

Further features, advantages and possible applications of the present invention are revealed from the following description of the exemplary embodiments and the figures. In this case all of the features described and/or shown by way of illustration individually and in any combination form the subject matter of the invention, irrespective of their composition in the individual claims or the back references thereof. Moreover, the same reference numerals refer to the same or similar objects in the figures.

DETAILED DESCRIPTION OF EXEMPLARY EMBODIMENTS

Figure 1:
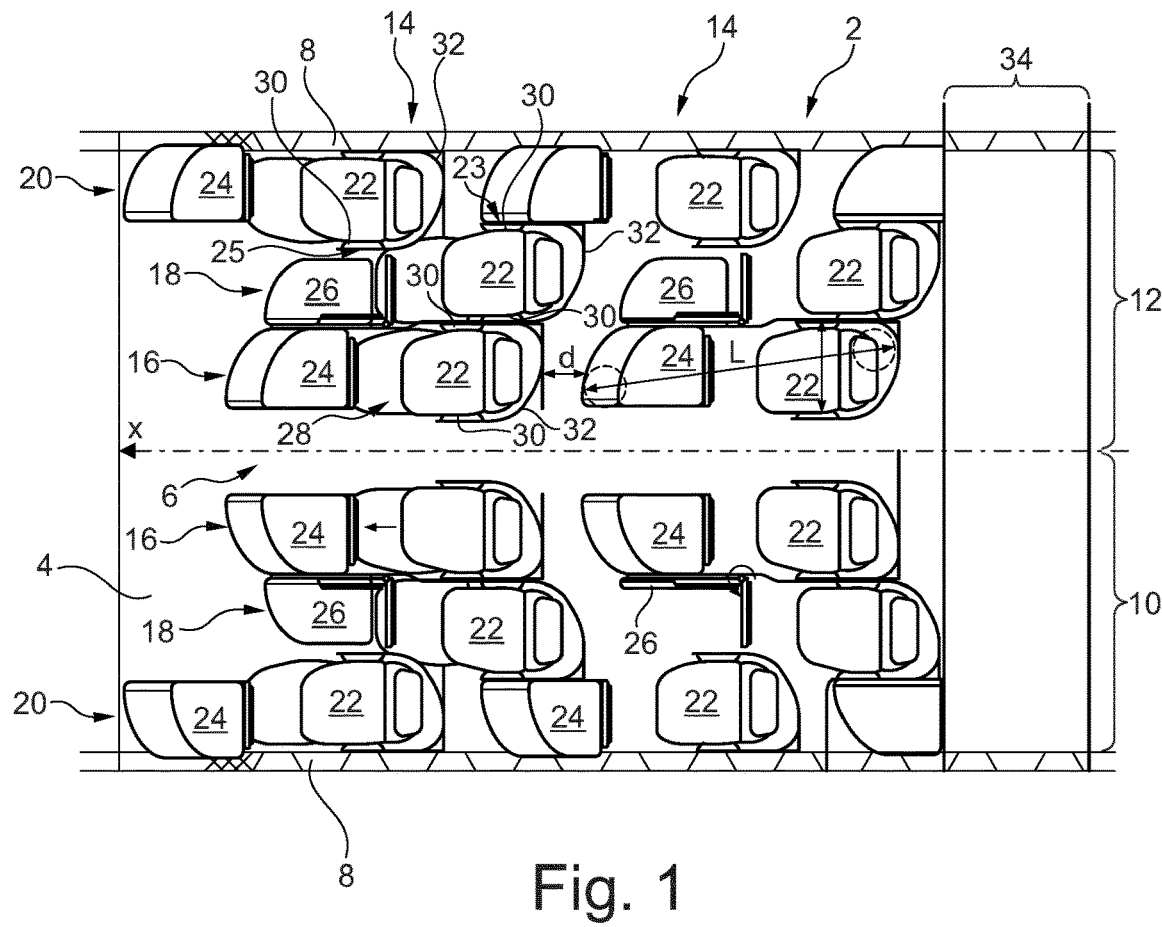
FIG. 1 shows a seat assembly in a cabin of an aircraft.

FIG. 1 shows a seat assembly 2 for a cabin 4 of a means of transportation, wherein the cabin 4 is designed by way of example as an aircraft cabin. This aircraft cabin has an aisle 6 which extends in a longitudinal direction or along a longitudinal axis x. The longitudinal direction x could coincide with the longitudinal axis in a fixed coordinate system of the aircraft. The aisle 6 is rectilinear by way of example and has a substantially uniform width. This width could be at least 15 inches (approximately 38 cm) and preferably at least 16 inches (approximately 40.6 cm) in order to permit the conveyance of a full-size trolley. Two mutually spaced cabin walls 8 which laterally delimit the cabin 4 in the lateral direction are provided parallel to the aisle 6. Outer passenger seat regions 10 (left in the longitudinal direction) and 12 (right in the longitudinal direction) are located in each case between a cabin wall 8 and the aisle.

A plurality of rows of seats 14, which are separated from one another by the aisle 6, are provided in the passenger seat regions 10 and 12. These rows of seats have a first seat module 16 which is located internally in the cabin 4 and faces toward the aisle 6. A second seat module 18 is arranged further to the outside and directly adjoins the first seat module 16. A third seat module 20 is adjoined further toward the outside. All of the seat modules 16, 18 and 20 in each case have a seat 22. The first seat module 16 and the third seat module 20 additionally have an ottoman 24. The second seat module 18, however, has a foldable foot rest 26. The individual seat modules 16, 18 and 20 are not arranged directly next to one another but displaced relative to one another in the longitudinal direction x.

The third seat module 20, which directly adjoins the respective cabin wall 8, is offset to the second seat module 18 in the longitudinal direction x such that the seat 22 of the third seat module 20 in the transverse direction is adjoined to the foot rest 26 of the second seat module 18. As a result, it is possible to pass from the aisle 6 past the first seat module 16 and the second seat module 18 to the seat 22 of the third seat module 20. Passing through the first seat module 16 and the second seat module 18 is thus not necessary.

As is shown further to the right in the drawing plane, a through-passage width d is provided which could be relatively small. At least 9 inches (ca. 22 cm) are cited by way of example. This is possible without any difficulty, in particular due to the relatively low height of the ottoman 24 of the first seat module 16, since the user who passes through between two successive first seat modules 16 does not feel constricted.

The seat 22 of the second seat module 18 is also able to be reached directly from the aisle 6 by the foot rest 26 being pivoted into a vertical position. In order to reach the second seat module 18, it is also not necessary to pass through the first seat module 16. The particularly advantageous use of space in the cabin 4 is also achieved by the common use of a through-passage from the aisle 6 to the second seat module 18 and the third seat module 20.

The first seat module 16 is also able to be reached directly and immediately from the aisle 6, since an access 28 between the seat 22 and the ottoman 24 faces directly into the aisle 6.

The seats 22 have in each case two laterally arranged armrests 30. The seats 22 of the first seat module 16 and the second seat module 18 are offset to one another in the longitudinal direction such that the armrest 30 which is oriented in each case toward the adjoining seat module 16 or 18, adjoins the armrest 30 of the seat 22 of the respective other seat module 16 or 18 in the longitudinal direction. The user who is respectively sitting on the seat 22 may thus use the armrests 30 comfortably and undisturbed by the respectively adjacent user. In the third seat module 20 the seat 22 is spaced apart from the seats of the other seat modules 16 and 18 to such an extent that a completely undisturbed use of the armrests 30 is also possible there.

Each seat module 16, 18 and 20 has a partition 32 which at least partially runs around the respective seat 22 and which is suitable for screening the respective user. The users obtain a certain degree of privacy thereby so that the perceived comfort of each user is significantly increased.

At least the partition 32 between the aisle-side and central seat 22 could be configured to be advantageously shaped with an S-shape in order to improve the access to the seats.

A further advantageous embodiment permits an increase in the space available if an S-shaped design of the partition 32 is provided in and immediately in front of the shoulder region in the two seats 22 adjoining one respective partition 32, wherein a uniform aisle width is ensured between the two partitions.

In the exemplary embodiment shown, the ottoman 24 of the third seat module 20 and the foot rest 26 of the second seat module 18 have a smaller width than the respectively associated seat 22. As a result, by the laterally adjoining arrangement of the foot rest 26 and seat 22, considerable installation space may be saved in the lateral direction without the comfort of an individual user being impaired.

The ottoman 24 of the third seat module 20 adjoins flush with the cabin wall 8. The foot rest 26, however, adjoins flush with the ottoman 24 of the first seat module 16. The ottoman 24 of the first seat module 16 could thus have a width substantially equal to the associated seat 22.

The seats 22 of the first seat module 16 and the second seat module 18 are, as already mentioned above, offset to one another merely by a short distance in the longitudinal direction x and thus arranged practically next to one another. In the case shown, the seat 22 of the first seat module 16 is offset approximately to the front in the longitudinal direction x. However, it may also be implemented in reverse, by the seat 22 of the second seat module 18 being offset to the front.

Seat widths of approximately 23 inches (approximately 58.5 cm) are provided merely by way of example. It is also conceivable to reduce the seat widths to approximately 20 inches (ca. 50.8 cm). A diagonal extension length 1 of the individual seat modules 16, 18 and 20 could be approximately 75 inches (approximately 190.5 cm) or more. This extension is a measurement of the bed length which may be produced if the seat modules 16, 18 and 20 are able to adopt a reclined position. To this end, the seats 22 of the individual seat modules 16, 18 and 20 are displaceable approximately parallel to the longitudinal direction x, so that a closed reclined surface (with the backrest pivoted) could be achieved in the individual seat modules 16, 18 and 20. The diagonal extension length 1 could by way of example be in a range of 70 to 78 inches (approximately 177.8 cm to 198.1 cm). Depending on the individual design criteria, this measurement may also be adapted by a few cm upwardly or downwardly, if required.

Moreover, a laterally external boundary of the seat 22 of the second seat module 18 may be located closer to the cabin wall belonging to the respective passenger seat region than a laterally internal boundary 25 of the seat 22 of the adjoining third seat module 20. The external boundary 23 of the seat 22 of the second seat module 18, as mentioned further above, could be located closer to the cabin wall 8, in a range of approximately 3 inches (ca. 7.6 cm) to approximately 8 inches (ca. 20.3 cm), than the internal boundary 25 of the seat 22 of the third seat module 20. As a result, a very good use of space is also achieved in the lateral direction.

Due to the particularly advantageous nested arrangement, considerable installation space may be saved in the longitudinal direction, which is indicated merely qualitatively and by way of example as additional installation space 34. The installation space is also optimized in the transverse direction by the advantageous staggered arrangement, such that the seat assembly shown may also be implemented in cabins having a width in a range of 3.7 m to 4.5 m.

Figure 2:
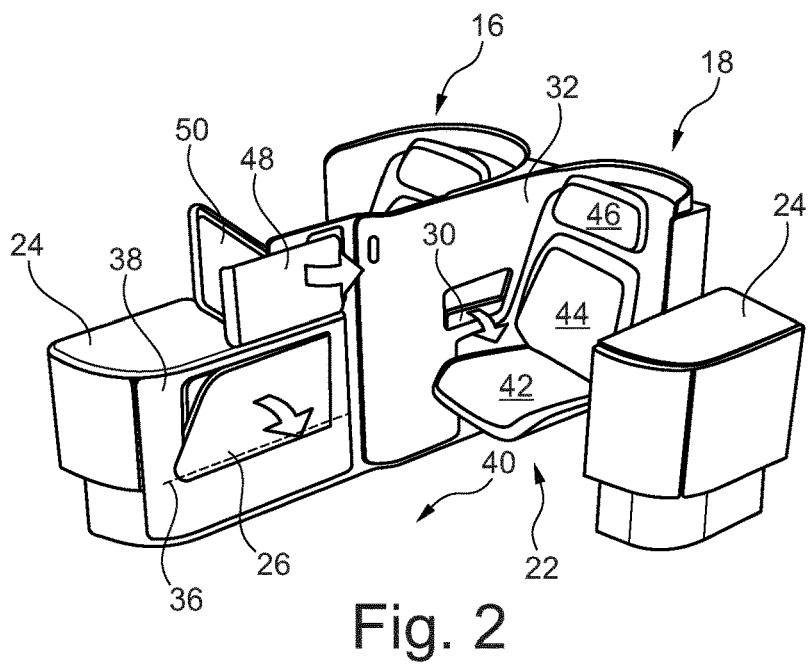
FIG. 2 shows a three-dimensional view of a first and a second seat module.

FIG. 2 shows a detail of the left outer passenger seat region 10 with the first seat module 16 and the second seat module 18. The view is taken from the direction of the third seat module 20 which has been omitted in this view.

Here by way of example it has been shown that the foldable foot rest 26 is pivotably mounted by way of example in the ottoman 24 of the adjoining first seat module 16. The foot rest may be folded around a hinge axis 36 into a vertically upwardly oriented stowed position or into a horizontal use position. If the foot rest 26 is folded upwardly, it is able to be located flush with a panel 38 of the ottoman 24. Then a floor 40 located in front of the seat 22 is free so that the seat 22 may be reached. Merely for the sake of completeness, the seat 22 is shown with a seat surface 42, a backrest 44 and a headrest 46. The seat surface 42 and the backrest 44 could be moved in the longitudinal direction x so that the seat 22 is able to adopt a flat seating or reclined position.

Moreover, by way of example a screen 48 may be pivotably provided, said screen also being able to be pivoted relative to the ottoman 24 of the adjoining first seat module 16 in order to reach the seat 22. The first seat module 16, however, has a preferably fixed screen 50. It is conceivable also to integrate the screen 48 of the second seat module 18 so that it is extendable from the wall 32.

Figure 3A:
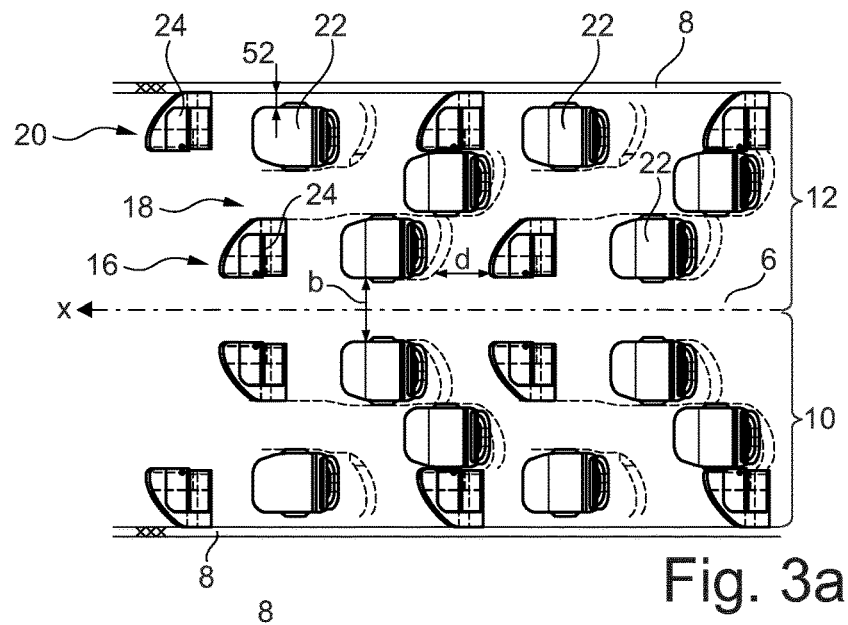
FIGS. 3a to 3c show differently modified seat assemblies.

The view in FIG. 1 is one of many possible exemplary embodiments. Depending on requirements, the seat assembly 2 may also be modified by axial or lateral spacings being adapted. This is shown by way of example in FIGS. 3a to 3c. In FIG. 3a a greatest possible spacing 52 is provided between the seat 22 and the cabin wall 8, for example in the third seat modules 20. This equates to the greatest possible headroom. At the same time, the through-passage width d is significantly increased here in comparison with FIG. 1. The individual seat modules 16, 18 and 20 are thus spaced significantly further apart from one another. The perceived comfort could be even further improved thereby but the gain in space is reduced in comparison with FIG. 1. Moreover, by the larger spacings, a larger aisle width b could also be achieved.

Figure 3B:
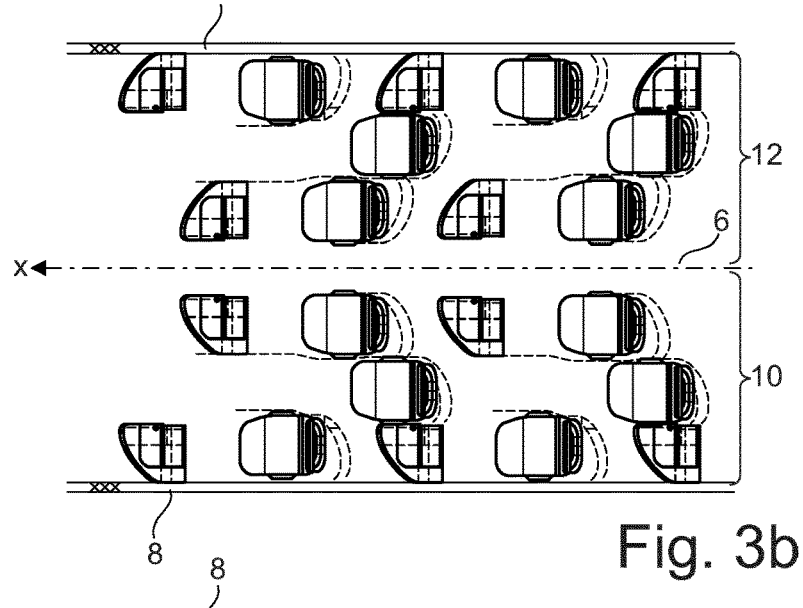
Figure 3C:
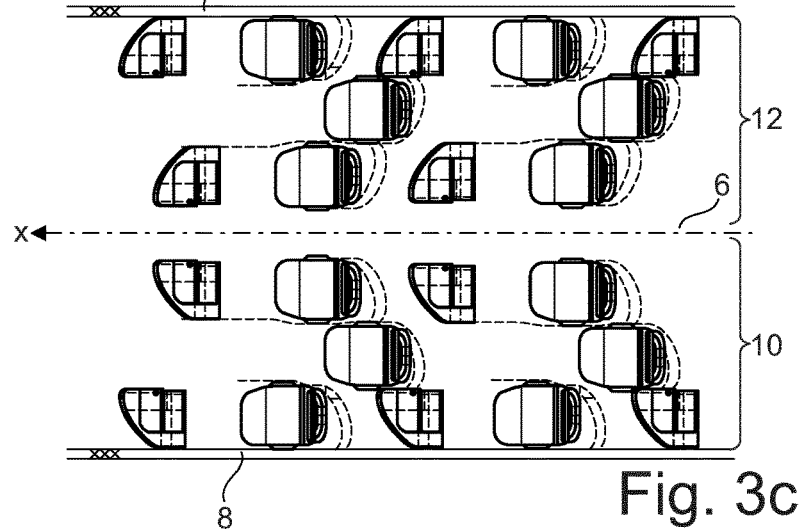

In FIG. 3b the spacing 52 from the cabin wall 8 is slightly smaller but still larger than in FIG. 1. The through-passage width d is slightly smaller, as is the aisle width b. FIG. 3c corresponds substantially to FIG. 1 and could represent the narrowest arrangement.

Figure 4:
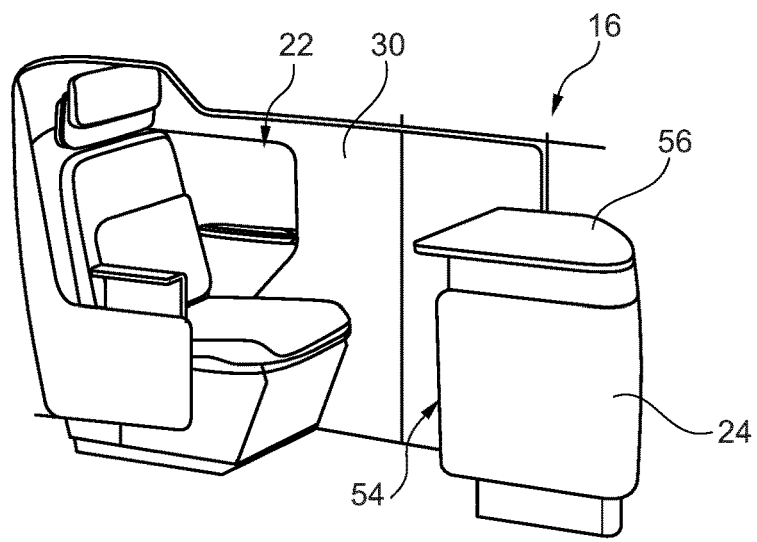
FIG. 4 shows a three-dimensional view of a first seat module.

In FIG. 4 the first seat module 16 is shown in a perspective view. Here the height of the wall 30 partially running around the seat 22 is shown. The ottoman 24 paired with the seat 22 has a foot rest, not shown here, on an inner face 54. A storage surface 56 is located on an upper face of the ottoman 24. As a result, it is possible for the cabin crew, for example, to store a tray when serving meals and beverages. This could also be intended, for example, for a user of the seat 22 of the second seat module 18.

It may also be advantageous to provide an extendable table or a segmented table instead of, or in combination with, the storage surface 56. An extendable table may possibly also be provided for fastening an IFE unit or a fold-out screen.

Figure 5:
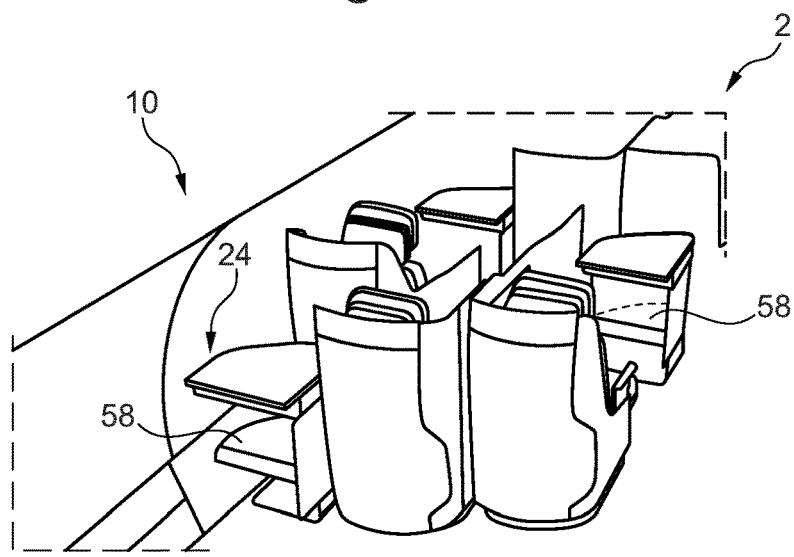
FIG. 5 shows a perspective view of a passenger seat region.

FIG. 5 shows the three seat modules 16, 18 and 20 of the left-hand outer passenger seat region 10. At this point the offset between the first seat module 16 and the second seat module 18 is very considerable. Moreover, a foot rest 58 of an ottoman 24 next to the seat 22 of the second module 18 and of the first seat module 16 is visible.

Figure 6:
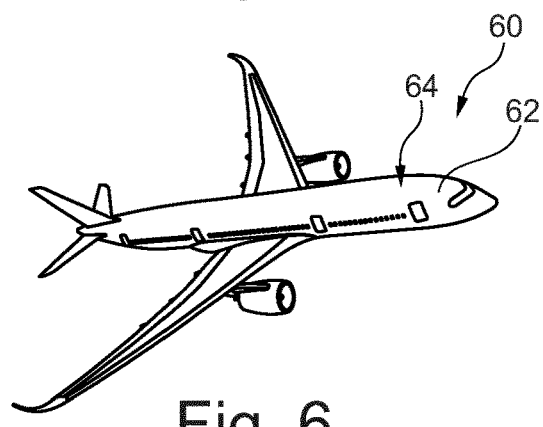
FIG. 6 shows finally an aircraft with a fuselage and a cabin configured therein with a seat assembly configured therein.

Finally FIG. 6 shows an aircraft 60 having a fuselage 62 and a cabin 64 configured therein, in which at least one such seat assembly 2 is provided.

In addition it should be mentioned that "having" does not exclude any other elements or steps, and "a" or "an" does not exclude a plurality thereof. Moreover, it should be mentioned that features which have been described with reference to one of the above exemplary embodiments may also be used in combination with other features of other above-described exemplary embodiments. Reference numerals in the claims are not to be regarded as a restriction.

REFERENCE NUMERALS

2 Seat assembly
4 Cabin
6 Aisle
8 Cabin wall
10 Passenger seat region
12 Passenger seat region
14 Row of seats
16 First seat module
18 Second seat module
20 Third seat module
22 Seat
23 Laterally external boundary
24 Ottoman
25 Laterally internal boundary
26 Foldable foot rest
28 Access
30 Armrest
32 Partition
34 Installation space
36 Hinge axis
38 Panel
40 Floor
42 Seat surface
44 Backrest
46 Headrest
48 Screen
50 Screen
52 Spacing
54 Inner face
56 Storage surface
58 Foot rest
60 Aircraft/means of transportation
62 Fuselage
64 Cabin
b Aisle width
d Through-passage width
l Extension length
x Longitudinal direction/longitudinal axis

The invention claimed is:

1. A seat assembly for a cabin of a means of transportation,
wherein the cabin comprises:
an aisle arranged in a longitudinal direction (x) of the cabin;
first and second mutually spaced cabin walls oriented parallel to the aisle at least in some regions and laterally delimiting the cabin; and
first and second outer passenger seat regions separated from one another by the aisle, wherein each of the first and second outer passenger regions adjoins one of the first and second cabin walls;
wherein the seat assembly comprises at least one row of seats;
wherein the first and second outer passenger seat regions have at least first and second rows of seats of the at least one row of seats, each of the first and second rows of seats comprising a respective inner first seat module facing the aisle, a central second seat module adjoining the inner first seat module, and an outer third seat module adjoining the respective cabin wall,
wherein each of the first and third seat modules has a seat and an ottoman paired with the seat and the second seat module has a seat and a foot rest at a distance from the seat,
wherein the outer third seat module is offset to the central second seat module in the longitudinal direction (x) such that the seat of the outer third seat module adjoins the foot rest of the central second seat module in the transverse direction, and wherein the seat of the outer third seat module, the seat of the central seat module, and the seat of the inner first seat module face in a same direction.

2. The seat assembly as claimed in claim 1,
wherein the foot rests and/or the ottomans of the central second and outer third seat modules, respectively, have a smaller width than the associated seat.

3. The seat assembly as claimed in claim 1,
wherein a laterally external boundary of the seat of the central second seat module is located closer to the cabin wall belonging to the respective passenger seat region than a laterally internal boundary of the seat of the adjoining outer third seat module.

4. The seat assembly as claimed in claim 1,
wherein the foot rest of the central second seat module is a foldable foot rest configured to clear a floor located below the foot rest for reaching the seat of the central second seat module.

5. The seat assembly as claimed in claim 1,
wherein the inner first seat module and the central second seat module are offset to one another in the longitudinal direction (x) such that armrests of the seats of the inner first and central second seat modules substantially do not overlap in the longitudinal direction (x).

6. The seat assembly as claimed in claim 5,
wherein the seat of the inner first seat module is located in front of the seat of the central second seat module in the longitudinal direction (x).

7. The seat assembly as claimed in claim 1,
wherein the at least one row of seats has a plurality of rows of seats,
wherein a distance of at least 22 cm is present between the inner first seat modules and central second seat modules of successive rows of seats, such that the central second seat module and the outer third seat module may be reached by a common through-passage.

8. The seat assembly as claimed in claim 1,
wherein the inner first, central second, and outer third seat modules have a partition running around the respective seat at least in some regions.

9. The seat assembly as claimed in claim 1,
wherein the seats of the inner first, central second, and outer third seat modules in each case have a seat direction running parallel to the longitudinal axis (x).

10. The seat assembly as claimed in claim 1,
wherein the inner first seat module has an access facing into the aisle.

11. The seat assembly as claimed in claim 1,
wherein at least one of the ottomans or the foot rest have a storage surface.

12. A cabin for a means of transportation having at least one seat assembly as claimed in claim 1.

13. The cabin as claimed in claim 12, wherein the cabin has a width in a range of 3.7 to 4.5 meter.

14. A means of transportation having a fuselage and at least one cabin configured therein as claimed in claim 12.

15. The means of transportation as claimed in claim 14, wherein the means of transportation is a commercial aircraft.

16. The seat assembly as claimed in claim 1,
wherein the inner first seat module is offset to the central second seat module in the longitudinal direction (x) by a first distance, and
wherein the outer third seat module is offset to the central second seat module in the longitudinal direction (x) by a second distance greater than the first distance.

* * * * *